United States Patent
Hartmann

(10) Patent No.: US 7,555,523 B1
(45) Date of Patent: Jun. 30, 2009

(54) SPAM DISCRIMINATION BY GENERALIZED NGRAM ANALYSIS OF SMALL HEADER FIELDS

(75) Inventor: Al Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 796 days.

(21) Appl. No.: 10/840,822

(22) Filed: May 6, 2004

(51) Int. Cl.
*G06F 15/16* (2006.01)
(52) U.S. Cl. .................. 709/206; 709/213; 709/224
(58) Field of Classification Search .............. 709/206, 709/213, 224
See application file for complete search history.

(56) References Cited

U.S. PATENT DOCUMENTS

| | | | |
|---|---|---|---|
| 6,144,934 A * | 11/2000 | Stockwell et al. ............. | 704/1 |
| 6,952,719 B1 * | 10/2005 | Harris ........................ | 709/206 |
| 2004/0167968 A1 * | 8/2004 | Wilson et al. ............... | 709/207 |
| 2004/0260776 A1 * | 12/2004 | Starbuck et al. ............. | 709/206 |
| 2005/0120019 A1 * | 6/2005 | Rigoutsos et al. ............. | 707/6 |
| 2005/0193073 A1 * | 9/2005 | Mehr et al. .................. | 709/206 |
| 2005/0262209 A1 * | 11/2005 | Yu ............................. | 709/206 |

* cited by examiner

*Primary Examiner*—William C Vaughn, Jr.
*Assistant Examiner*—Mohamed Ibrahim
(74) *Attorney, Agent, or Firm*—Fenwick & West LLP

(57) ABSTRACT

In the method of the present invention, spam is detected by extracting generalized Ngrams from a section of an e-mail (104). A spam manager (101) extracts (502) a sequence of characters from a section of an email. The spam manager (101) iterates (504) subsequences within the sequence. The spam manager (101) compares (506) subsequences to collections of spam-distinguishing subsequences to identify spam e-mail (104) messages.

31 Claims, 7 Drawing Sheets

SPAM DISCRIMINATION BY GENERALIZED NGRAM ANALYSIS OF SMALL HEADER FIELDS

TECHNICAL FIELD

This invention pertains generally to computer security, and more specifically to detecting spam using generalized Ngram analysis.

BACKGROUND ART

Unsolicited and undesired e-mail, or spam, is a becoming a significant problem with the increasing amount of spam sent over computer networks, causing a substantial nuisance to e-mail users. Spam causes waste of network bandwidth, messaging system resources, and both human and computer processing time. As used herein, "spam" is any e-mail that is unwanted or unsolicited by the recipient or to which the recipient did not consent.

To reduce this problem, anti-spam filtering software and/or hardware may be deployed to analyze message streams to discriminate between spam and non-spam e-mail messages. Spam filters, however, typically focus on analysis of the content of e-mail messages, which can require substantial analysis time due to the size of the e-mail body and due to the fact that e-mail systems are frequently inundated with a flood of spam messages.

Considerable spam-filtering efficiency could be gained by avoiding extensive content examination of each and every e-mail message. Instead, bulk spam e-mails can be readily identified by simple header field examination, such as analysis of From/To fields and/or Subject header fields. In addition, such a header analysis could be an effective form of spam discrimination for newer forms of spam, such as cellular phone message spam, blog comment thread spam, or instant messaging spam (or "spim"). Each of these spam types lack significant content body, making traditional content-based spam-filtering less effective. In these spam types, the entire spam message can be encapsulated in a brief line of text. However, current anti-spam technology does not provide any effective mechanism for a quick and statistically accurate analysis of e-mail headers and the characters of which the headers are composed. Thus, it would be useful to have an efficient mechanism for conducting quick header analyses of e-mail either alongside standard e-mail content scans, as a preliminary analysis to full content scans, or even as a standalone method for analysis of the brief content of some newer forms of short message spam.

Spam senders are also becoming more savvy to the potential for spam-filtering software to recognize words frequently used in spam e-mails and to recognize bulk e-mailings of spam. Spam-filtering software analyses often focus on detection of individual spam e-mail messages or on the association of e-mail messages with a similar group of bulk e-mailings based upon identifiable spam features. To elude automated spam-filter detection, spam senders sometimes disguise spam e-mail by adding randomization to e-mails and/or disguising typical spam e-mail terms. Thus, it would be useful to employ statistical methods to actually turn these evasion techniques against spam senders and to detect spam by the presence of randomization and/or feature disguise in e-mail.

What is needed are methods, computer readable media, and systems that employ statistical methods to allow for accurate spam detection with a quick scan of incoming e-mail headers or e-mail content, and which will also recognize and use as an advantage the randomization and feature disguise methods typically used by spam senders.

DISCLOSURE OF INVENTION

The present invention comprises methods, systems, and computer readable media for detecting spam e-mail by extracting generalized Ngrams from a section of an e-mail. In some embodiments, a spam manager (101) extracts (502) a sequence of characters from a section of an email (104). The spam manager (101) iterates (504) subsequences within the sequence. The spam manager (101) also compares (506) subsequences to collections of spam-distinguishing subsequences to identify spam e-mail (104).

The features and advantages described in this summary and in the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
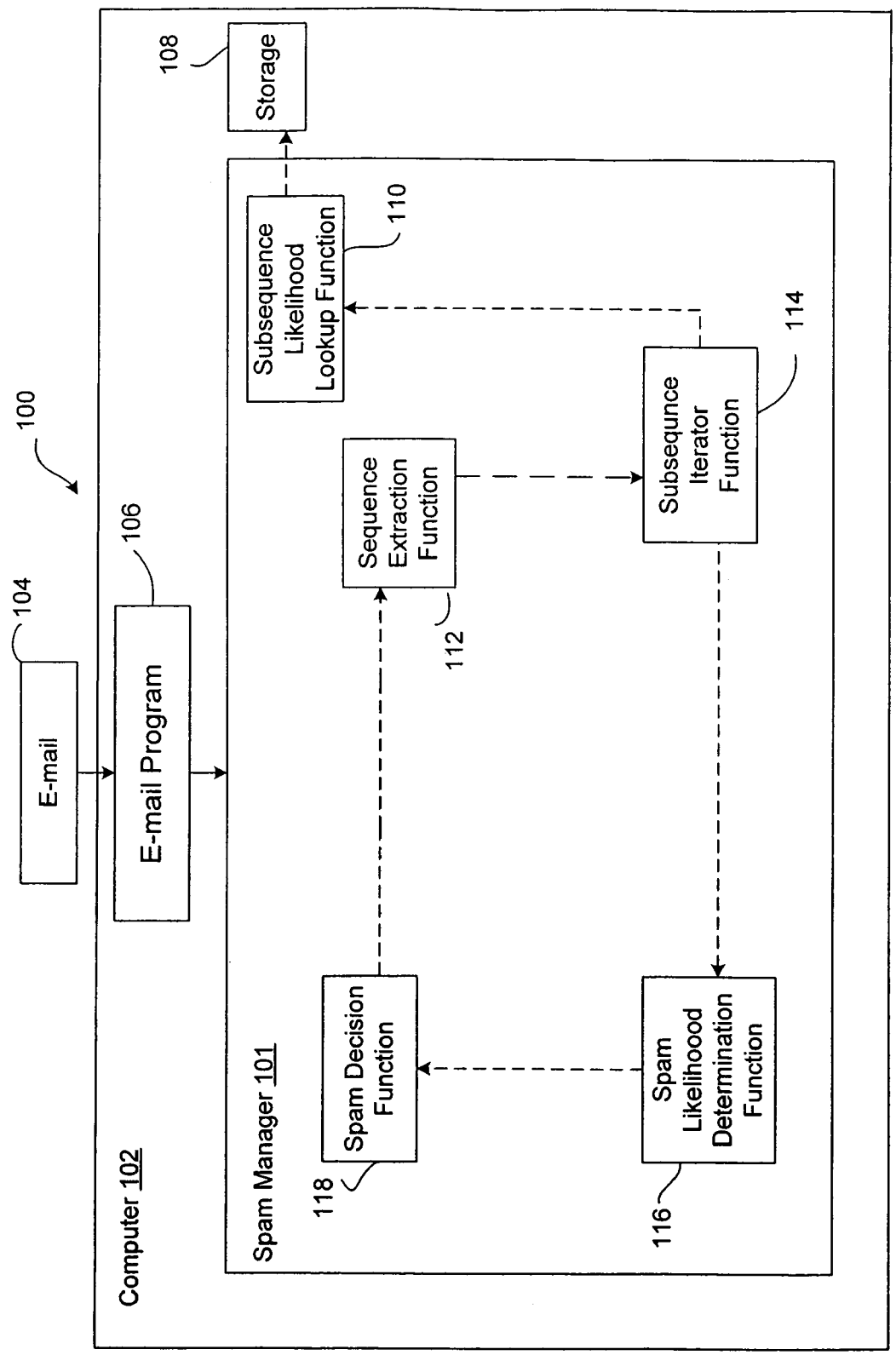
FIG. 1 is a block diagram illustrating a high level overview of a system for practicing some embodiments of the present invention.

FIG. 1 illustrates a high level overview of a system 100 for performing some embodiments of the present invention. A spam manager 101 detects spam e-mail 104 by extracting generalized Ngrams from a section of an e-mail 104.

It is to be understood that although the spam manager 101 is illustrated as a single entity, as the term is used herein a spam manager 101 refers to a collection of functionalities that can be implemented as software, hardware, firmware or any combination of the three. Where a spam manager 101 is implemented as software, it can be implemented as a standalone program, but can also be implemented in other ways, for example as part of a larger program, as a plurality of separate programs, or as one or more statically or dynamically linked libraries.

In some embodiments the spam manager 101 is implemented as a software program, which can run on a general purpose computer 102, as shown in the Figures. The spam manager 101 can also run on an e-mail server, a gateway, or other computer or combination of computers. In other embodiments, the functionalities performed by the spam manager 101 are distributed between multiple computers. In some embodiments, at least one step is performed by a server, gateway, and/or client computer.

Figure 2:
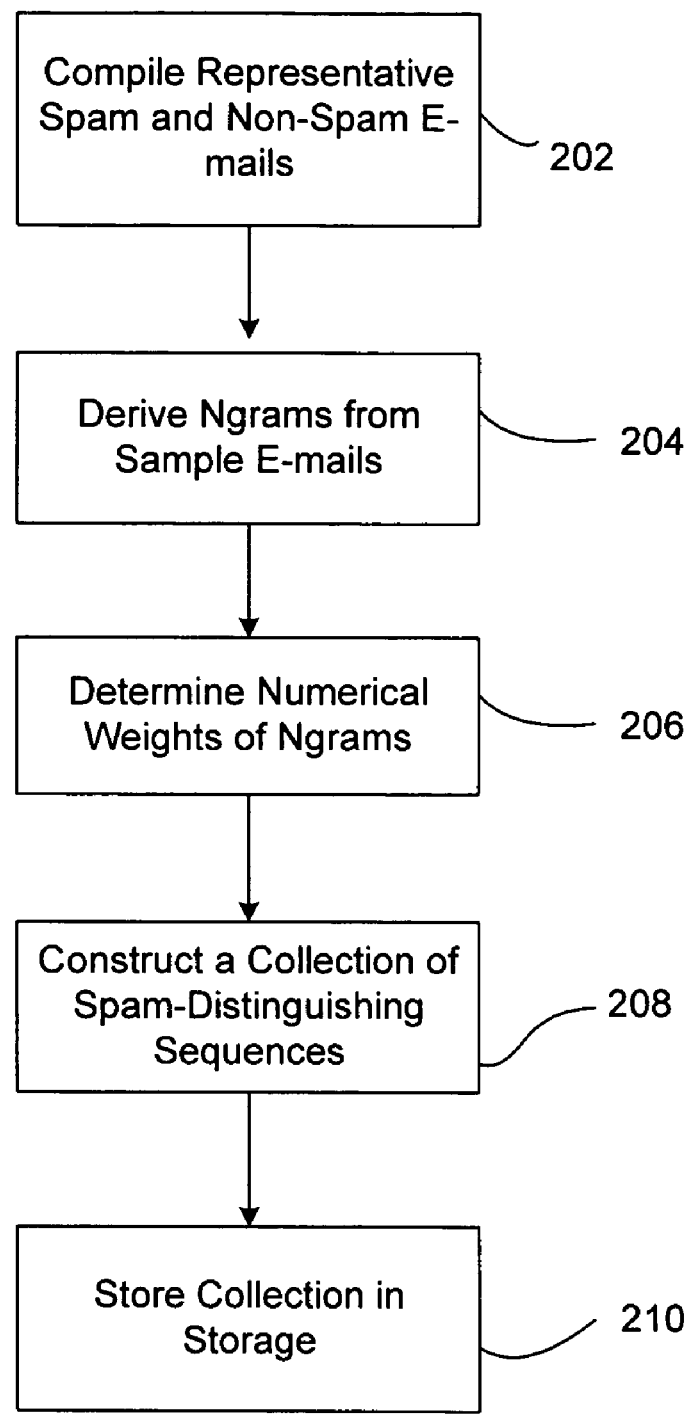
FIG. 2 is a flowchart illustrating steps for practicing some embodiments of the present invention.

It is to be understood that although FIG. 1 illustrates only a single flow of the spam manager 101 e-mail scanning functions for the purpose of visual clarity, typically a spam manager 101 can scan many e-mails 104 simultaneously. Scanning multiple e-mails 104 to detect spam is known to those of ordinary skill in the relevant art, and its application within the context of the present invention will be readily apparent to such ordinarily skilled artisans, in light of this specification. In addition, the functionalities illustrated in FIGS. 1 and 2 are shown as separate functionalities, but these functionalities can be combined in various ways and can each be performed by the spam manager 101 or by any other combination of software components.

Referring again to FIG. 1, the spam manager executes on a computer 102. At least one incoming e-mail 104 is received by the e-mail program 106, and the spam manager 101 analyzes the incoming e-mail 104. The spam manager 101 employs a sequence extraction function 112 to extract a sequence of characters from the e-mail 104. The sequence of characters can be extracted from the content or body of an e-mail, the e-mail header, or both. The sequence of characters extracted can be any length. If the sequence is extracted from an e-mail header, it can be extracted from one or more header fields, including the To/From fields, the Subject field, or any other e-mail header field including fields that may not currently be contemplated in the art. The sequence extracted from the e-mail header field can include the entire sequence of characters making up the header field, or any portion of the sequence of characters in the header field.

The spam manager 101 executes a subsequence iterator function 114, whereby the spam manager 101 extracts a number of subsequences from the sequence extracted in the sequence extraction function 112. The subsequences iterated are commonly successive subsequences, but can be any subsequence in the e-mail and do not necessarily have to be in succession. The subsequences extracted are Ngrams and can be used in Ngram analysis. Ngram analysis is a method for text analysis that is traditionally employed in the field of lexicography. An Ngram is an N-letter subsequence taken from selected text. In particular, Ngrams in which N equals one are termed "unigrams," Ngrams in which N equals two are termed "bigrams," Ngrams in which N equals three are termed "trigrams," and so forth. To illustrate, in the word "example," the unigrams are the letters "e," "x," "a," "m," "p," "l," and "e," while the bigrams are "ex," "xa," "am," "mp," "pl," and "le," and the trigrams are "exa," "xam," "amp," "mpl," and "ple."

In the present invention, a generalized form of an Ngram comprising an N-character subsequence can be extracted from a sequence of characters in an e-mail 104 or in an e-mail 104 header field. Typically, lexicographers use Ngrams in the analysis of words, but in the present invention, Ngrams can be used in the analysis of various different types of characters, including alphabetic characters, numerical characters, punctuation marks, symbols, white space, blanks, horizontal tabs, illegal characters (e.g., characters that are not supposed to be included in e-mail header fields), meta words, and the like.

In some embodiments, the text of an e-mail 104 or e-mail 104 header field can be broken apart into separate character classes. For example, the e-mail can be broken apart into a separate class for alphabetic characters, a separate class for numerical characters, and a separate class for punctuation. Thus, characters can be subdivided into classes that are chosen so that each Ngram contains characters of a defined character class, and none of the Ngrams contain a mix of characters of different types. In other embodiments, the text of an e-mail 104 or e-mail 104 header field can be treated as being in a single character class. If the text in an e-mail 104 is viewed as a single character class, then each Ngram could include any N-character subsequence, including alphabetic characters, numerical characters, punctuation, and the like. Thus, any Ngram subsequence can contain a combination of any type of character.

As an example of the division of e-mails 104 into character classes, consider the following example e-mail 104 subject header:

Tope▮100▮hits▮!!!

In this and the other examples, the character "▮" is used to represent white space. This e-mail subject header can be divided into trigrams, for example. The example header includes four different types of characters: alphabetic, numeric, punctuation, and white space. If the example header is divided into trigrams in which all four of these character types are treated the same and are not subdivided into separate classes, then the single universal character trigrams would appear as follows:

Top, op▮, p▮1, ▮10, 100, 00▮, 0▮h, ▮hi, hit, its, ts!, s!!, !!!

Alternatively, the characters can be divided into four separate classes, or into fewer classes. For example, there can be one class that includes alphabetic and numeric characters, and one class that includes white space and punctuation. There could alternatively be a class for numerical characters and a class for alphabetic characters, and the punctuation and white space could be excluded from the Ngram extraction. Any other combination of classes can be created. As an example, if the characters are divided into three separate classes, one class for alphabetic, one for numeric, and one for punctuation, the trigrams would appear as follows:

Top, 100, hit, its, !!!

In this example, each trigram includes either only alphabetical characters, only numerical characters, or only punctuation marks. These classes are divided so that no trigram includes a combination of character types.

Both the size of the Ngrams selected (e.g., unigrams, bigrams, trigrams, tetragrams, etc.) and the character class divisions are design parameters and can be chosen according to increased effectiveness in spam discrimination. For example, if trigrams or if a combination of trigrams and bigrams are found to be the most effective in discriminating between spam and non-spam, then the method of the present invention could incorporate the use of trigrams or a combination of trigrams and bigrams. If the Ngrams are found to be most effective in spam discrimination when the characters are treated as a single class or when the characters are divided into particular subclasses, then the method of the present invention could be designed accordingly. Language differences may also influence the character classes selected and the Ngram sizes (i.e., certain character classes and Ngrams sizes may be more effective for e-mails 104 in French than in English).

Referring still to FIG. 1, the spam manager 101 executes a subsequence likelihood look-up function 110, wherein the spam manager 101 looks up, in a collection of spam-distinguishing subsequences, the iterated subsequences or Ngrams extracted from an e-mail. The collection of spam-distinguishing subsequence is maintained in storage 108, to which the spam manager 101 has access. The collection can be embodied in a dictionary of spam-distinguishing subsequences, such as a dictionary of Ngrams. The collection can include a table of spam-distinguishing subsequences, such as a table representing characters or Ngrams along two axes. Alternatively, the collection can be comprised of any other type of form or structure that catalogues subsequences that can be used in spam discrimination. The collection of spam-distinguishing features will be discussed in more detail below.

The spam manager 101 executes a spam likelihood determination function 116 based on the iteration of subsequences 114 and the information retrieved during the subsequence likelihood look-up function 110. Statistical methods are applied to determine whether or not an e-mail is spam. Spam discrimination methods are discussed in more detail below.

After the spam likelihood determination 116 is applied, a spam decision function 118 takes place. The spam manager 101 decides, based on the information determined through subsequence iteration 114, subsequence likelihood look-up 110, and spam likelihood determination 116, whether or not the e-mail 104 is spam. The spam manager 101 can then report the results of this analysis to the e-mail program 106 or to other spam filter software (not shown), and these components can then take appropriate action. The spam manager 101 can also be configured to filter spam e-mails 104 itself when a positive spam detection is made.

The present invention can act as a preliminary spam filter that is applied to e-mail 104 before additional scanning of e-mail 104 takes place by traditional spam scanning software. If the spam manager 101 determines that it is likely that the e-mail 104 is spam, it may not be necessary to do further analysis, and the e-mail 104 can be appropriately quarantined. If, after the preliminary scan, the results are inconclusive or have not reached some defined threshold for spam likelihood, then a full e-mail 104 content scan can be conducted. Alternatively, the spam manager 101 can be used in conjunction with various other scanning techniques for spam detection. The spam manager 101 could also be used alone, as the sole method of spam detection without any other scanning software.

Referring now to FIG. 2, there is shown a flowchart for performing steps according to some embodiments of the present invention. In FIG. 2, the spam manager 101 constructs 208 a collection of spam-distinguishing subsequences that can be used as described above, to help discriminate between spam and non-spam. The collection of spam-distinguishing subsequences can be embodied in a dictionary or table form, which is described in more detail below. As described previously, the spam manager 101 executes on a computer 102. Incoming e-mails 104 are received by the e-mail program 106, and the spam manager 101 analyzes this test sample of incoming e-mails 104 by executing a representative spam and non-spam e-mail 104 compilation function. This function can be optional in the creation of a table of spam-distinguishing subsequences, and this is discussed in more detail below. The spam manager 101 compiles 202 a set of incoming e-mails 104 that were identified as spam or as non-spam e-mails 104. For dictionary creation and optionally for table creation, the spam manager 101 derives 204 Ngrams from sample e-mail 104 sets and measures the relative occurrence frequency of each Ngram over the sample sets.

The spam manager 101 then determines 206 the numeric weights of the Ngrams. These weights provide information about likelihood of the Ngram to be found in non-spam text and/or in spam text. Based on information gathered and computed, the spam manager 101 then constructs 208 a collection of spam-distinguishing subsequences to be used in detecting spam. The collection of subsequences that is constructed is stored 210 in storage 108, and can be later accessed by the spam manager 101 during analysis of incoming e-mails 104.

Figure 3:
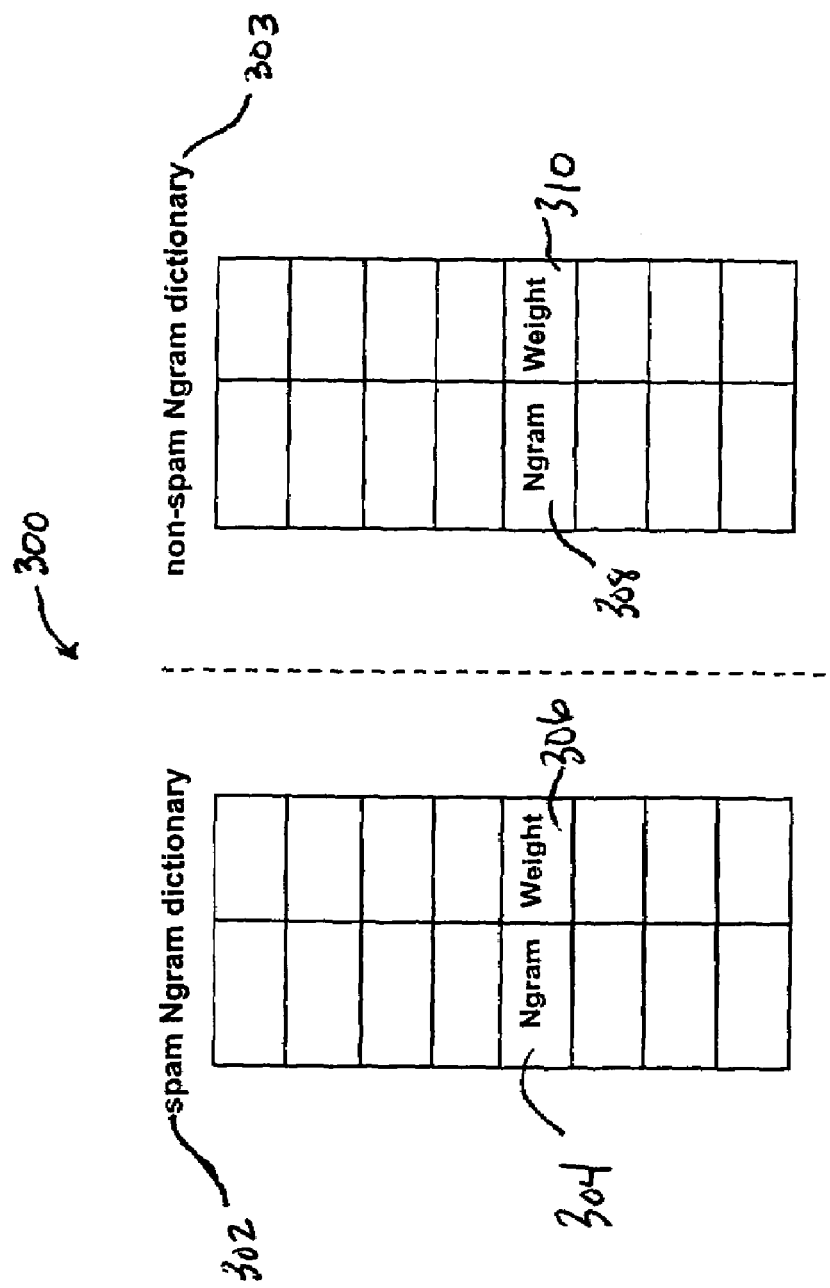
FIG. 3 is a diagram of an example of an Ngram dictionary, according to some embodiments of the present invention.
Figure 4:
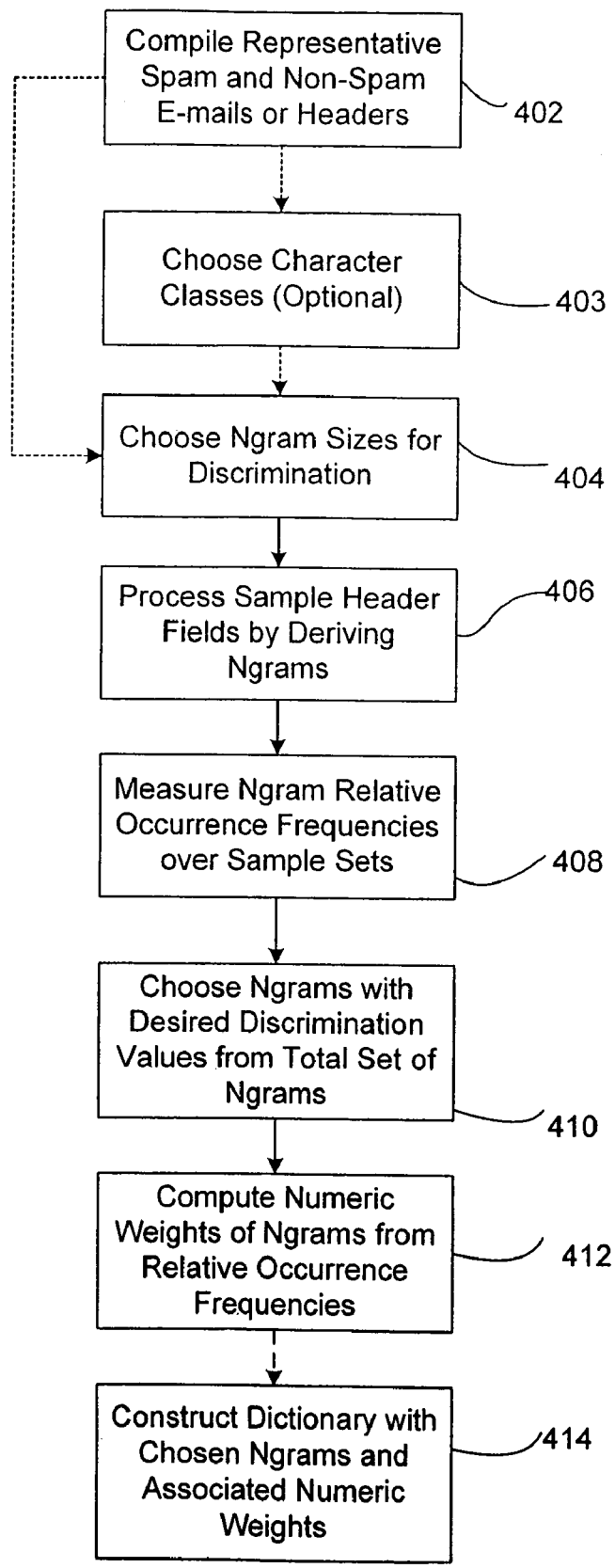
FIG. 4 is a flowchart illustrating steps for the spam manager to construct an Ngram dictionary, according to some embodiments of the present invention.
Figure 5:
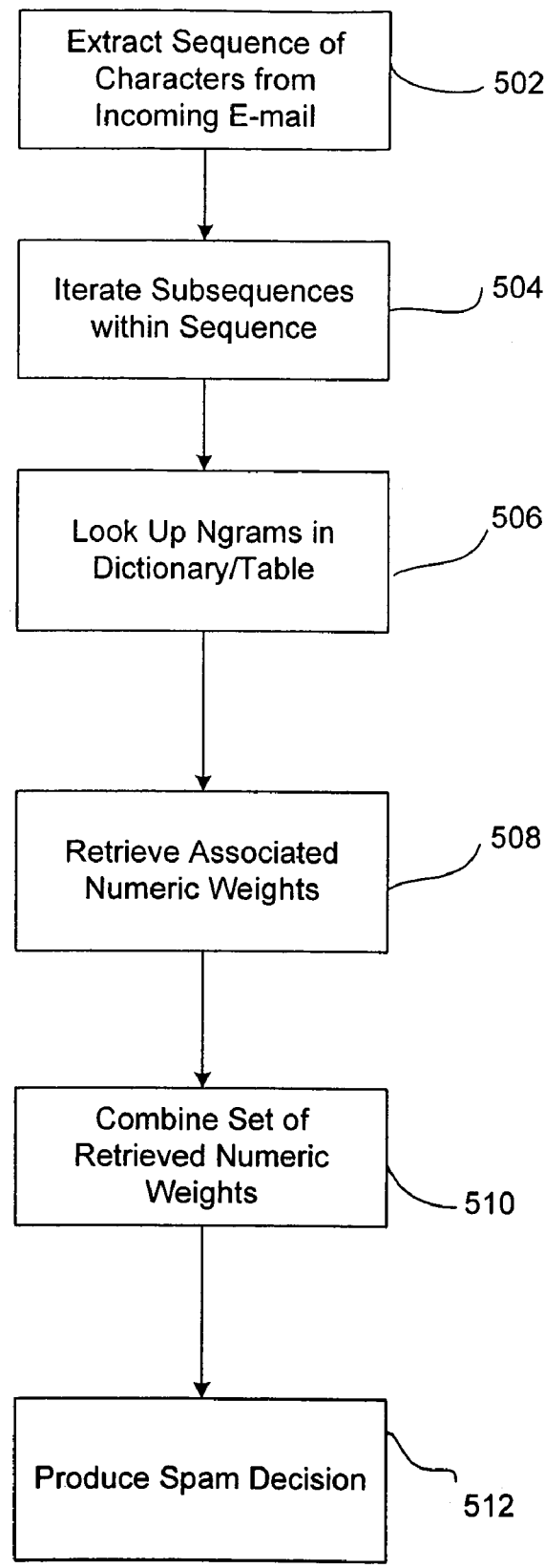
FIG. 5 is a flowchart illustrating steps for the spam manager to discriminate between spam and non-spam e-mails using a dictionary or table, according to some embodiments of the present invention.
Figure 6:
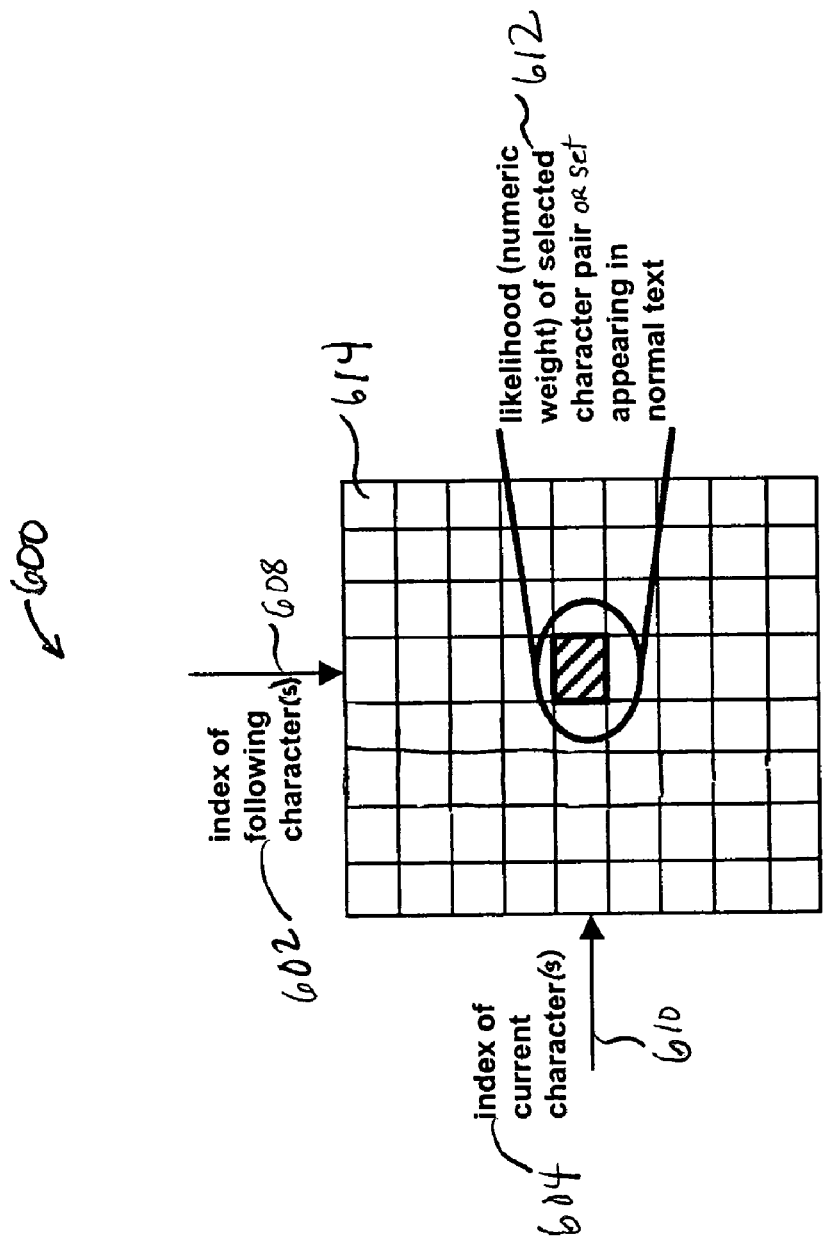
FIG. 6 is a diagram of an example of an Ngram table, according to some embodiments of the present invention.
Figure 7:
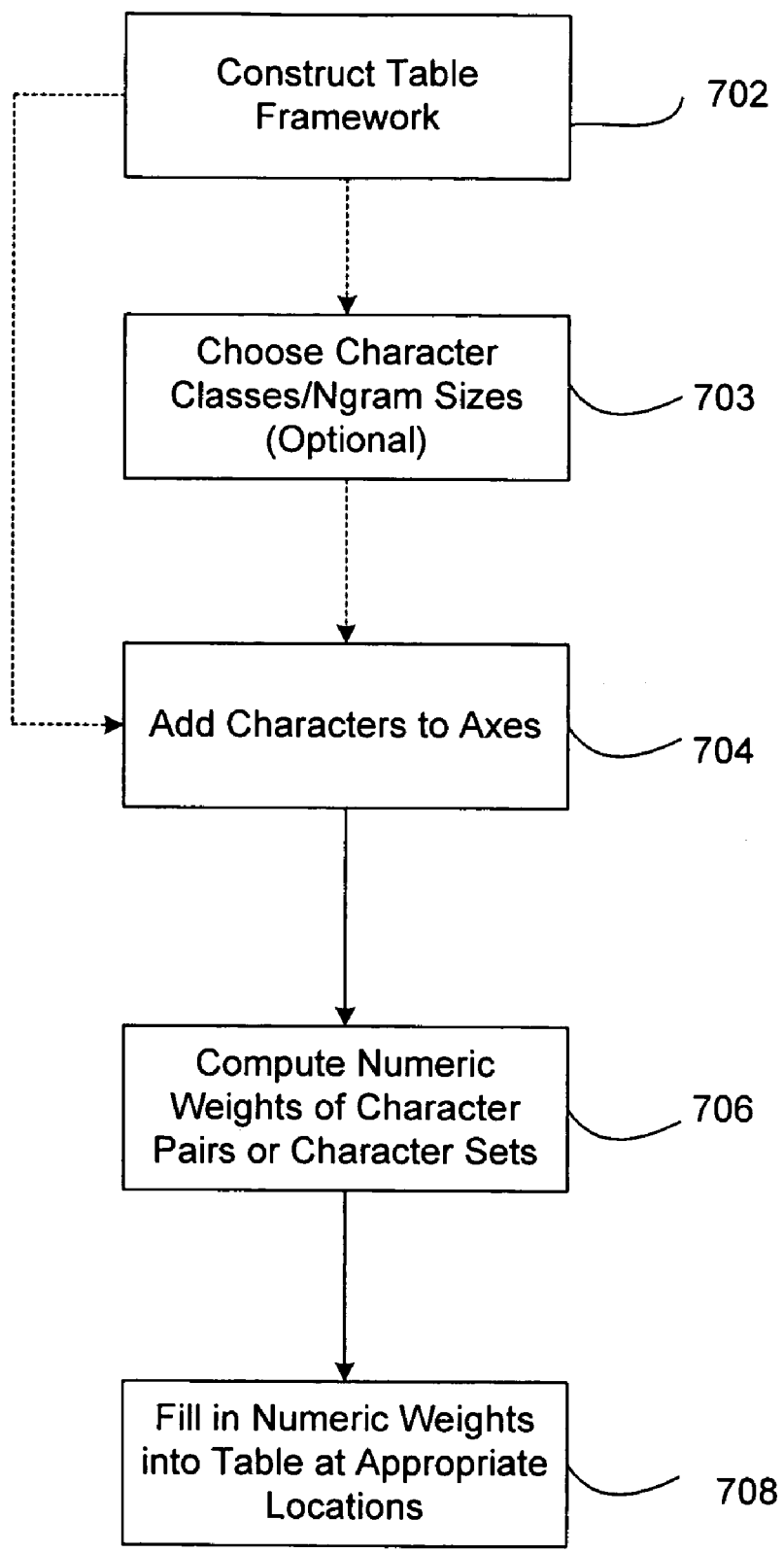
FIG. 7 is a flowchart illustrating steps for the spam manager to construct an Ngram table, according to some embodiments of the present invention.

As described above, a collection of spam-distinguishing features (a dictionary, a table, or other type) can be constructed 208 for use in discrimination between spam and non-spam in accordance with the present invention. FIGS. 3 and 4 illustrate the dictionary form of the collection of spam-distinguishing features and its construction. FIGS. 6 and 7 illustrate the table form of the collection of spam-distinguishing features and its construction. FIG. 5 illustrates the use of either a table or dictionary for discrimination between spam and non-spam.

Referring now to FIG. 3, there is shown an example of a dictionary pair 300 that could be constructed in the present invention. The spam Ngram dictionary 302 includes Ngrams entries 304 that are more likely to appear in spam e-mail 104 content or header fields. The non-spam Ngram dictionary 303 includes Ngrams entries 308 that are more likely to appear in non-spam e-mail 104 content or header fields. Associated with each dictionary pair 300 entry is a numeric weight 306, 310, which is typically derived from the relative occurrence frequencies of the Ngrams within a sample set of representative spam and non-spam e-mails 104. These numeric weights 306, 310, can be used in the spam likelihood determination function 116, described in FIG. 1, to make an overall decision over whether an incoming e-mail 104 is spam or not. In other embodiments, a single dictionary is constructed that can use both positive and negative numeric weights (or other types of weights) to distinguish between spam and non-spam.

FIG. 4 is a flowchart illustrating a method of constructing a collection of spam-distinguishing features, according to some embodiments of the present invention. The method of FIG. 4 can be used to construct 414 the dictionary pair 300 illustrated in FIG. 3. In some embodiments, the dictionary pair 300 is constructed as a part of the construction process for the spam manager 101. Thus, the dictionary pair 300 is constructed in advance, as part of the spam manager 101 creation process, in these embodiments. In other embodiments, a modified or adaptive form of the spam manager 101 can construct the dictionary pair 300 as part of a spam manager 101 adaptation process. In this adaptation process, the spam manager 101 can continue to develop the dictionary pair 300 while the spam manager 101 is detecting spam. Such an adaptive spam manager 101 might only modify certain parts of the dictionary pair 300 (i.e., might modify the weights included in the dictionary pair 300). However, such an adaptive spam manager 101 could also be configured to fully construct the dictionary pair 300. The discussion below regarding FIG. 4 focuses primarily on the embodiments in which the spam manager 101 constructs the dictionary pair 300 through the spam manager 101 adaptation process. However, each of the steps illustrated in FIG. 4 could be performed in advance, during the development of the spam manager 101 (in a spam manager 101 creation process), rather than being performed by the spam manager 101, itself.

In the embodiment illustrated in FIG. 4, the spam manager 101 creation or adaptation process compiles 402 a sample of representative spam and non-spam e-mails 104 and/or e-mail header fields. This test sample of e-mails 104 may have been identified as spam or non-spam by spam-filtering software or other types of software, by manual review of the e-mail 104, or by any other discriminatory method.

As described previously, the spam manager 101 creation or adaptation process optionally chooses 403 (using an adaptation and/or creation process) character classes among the representative spam and non-spam e-mail 104 content or header fields. Character classes are chosen 403 to maximize effectiveness in distinguishing between spam and non-spam. The character classes chosen 403 may vary depending on the language of the e-mail 104. Character classes are selected to provide the best discrimination between spam and non-spam. Numerous test samples of e-mails 104 can be taken using Ngrams of different character class combinations to determine which provide the most effective discrimination.

The spam manager 101 creation or adaptation process selects 404 the Ngram sizes to use in discriminating between spam and non-spam e-mails 104. The Ngrams are selected 404 based upon statistical metrics (e.g., information gain or gain ratios) that quantify the discriminatory value of particular Ngrams. The Ngram sizes chosen 404 may vary depending on the language of the e-mail 104. Ngrams sizes are typically selected 404 to provide effective discrimination between spam and non-spam. Numerous test samples of e-mails 104 can be taken using Ngrams of different sizes to determine which provide the most effective discrimination.

The spam manager 101 creation or adaptation process then processes 406 the sample e-mails 104 by deriving Ngrams from the e-mail content, from header fields, or from both. Ngrams are derived using the sequence extraction function 112 described in FIG. 1, to extract a sequence of characters from a section of an e-mail 104. Ngrams are extracted from this sequence.

Once Ngrams are derived from the sample e-mails 104, the spam manager 101 creation or adaptation process measures 408 the relative occurrence frequencies of Ngrams over the sample sets of e-mails 104. It is possible to measure 408 the occurrence frequency of Ngrams within the e-mail 104 body, within e-mail 104 header fields, or within both. For example, the tetragram "FREE" or the trigram "!!!" might be expected to have a high spam subject field occurrence frequency. It is also possible to measure 408 how often each Ngram appears in spam e-mail 104, in non-spam e-mail 104, or in both.

The spam manager 101 creation or adaptation process then chooses 410 the Ngrams with desired discrimination values from the total set of Ngrams extracted from the sample e-mails 104. For example, Ngrams with the highest relative occurrence frequencies in spam e-mails 104 can be collected. In some embodiments, Ngrams with the highest relative occurrence frequencies in non-spam e-mails 104 are collected.

After choosing 410 the Ngrams, the spam manager 101 creation or adaptation process then computes 412 the numeric weights of the Ngrams using the relative occurrence frequencies. As described above, the numeric weights can be computed for Ngrams appearing in spam e-mails 104, in non-spam e-mails 104, or both. Thus, a dictionary pair 300 including a spam Ngram dictionary 302 and a non-spam Ngram dictionary 303 can be constructed. Alternatively, positive and negative numeric weights can be used to distinguish between spam and non-spam.

Based on information gathered regarding the sample e-mail 104 sets, the spam manager 101 creation or adaptation process constructs 414 a dictionary pair 300 with the chosen Ngrams and associated weights. The spam manager 101 creation or adaptation process can construct 414 a dictionary of Ngrams, a table including Ngram information, or another type of collection. These collections can include Ngrams that are frequently found in spam e-mails 104, Ngrams that are frequently found in non-spam e-mails 104, or both. In some embodiments of the present invention, a pair of dictionaries 300 is constructed 414, in which one dictionary 302 contains Ngrams that are commonly found in spam e-mails 104 and the other dictionary 303 includes Ngrams that are commonly found in non-spam e-mails 104. The dictionary or dictionaries can be used in the present invention, as described previously, to look up the Ngrams that are extracted from an incoming e-mail 104 and use associated numeric weights to discriminate between spam and non-spam.

This method can be implemented in either software or hardware form. Because of its simplicity and small amount of text analysis, it is suited to either style of implementation. In software, the Ngram dictionary pair 300 could be stored in an associative data structure, such as a hash table, a binary search tree, a red/black tree, and other similar structures. In hardware, the Ngram dictionaries could be stored in a content-addressable memory (CAM). The method can also be implemented in firmware, or any combination of software, hardware, or firmware.

Referring now to FIG. 5, there is shown a flowchart illustrating a method of distinguishing between spam and non-spam e-mails 104, according to some embodiments of the present invention. The spam manager 101 extracts 502 a sequence of characters from one or more incoming e-mails 104. The spam manager 101 then iterates 504 subsequences within the sequence. The spam manager 101 iterates 504 subsequences by extracting Ngrams from the sequence.

The Ngram size and optional character classes can be preset in the system according to the sizes and classes used in generation of the Ngram dictionary pair 300. The user can also have the option to modify Ngram sizes and character classes during the use of the system 100 in spam discrimination. As described previously, the system can be configured to use either a static dictionary pair 300 construction process or a dynamic dictionary pair 300 adaptation process. As an example of the adaptation process, the system can be configured to continue to develop the dictionary pair 300 or table as the system is being used. If a particular Ngram that is not currently in the dictionary pair 300 is found to be present frequently in spam e-mails 104, this Ngram can be added to the dictionary pair 300 and a numeric weight calculated.

In this adaptation process, the dictionary pair 300 can be continuously updated as the system 100 functions to detect spam e-mail 104. As new types of spam appear or new patterns of words are found in spam, the dictionary pair 300 can be updated accordingly to include Ngrams for these newer types of spam. The numeric weights of both new and old Ngrams in the dictionary pair 300 can be updated over time to improve accuracy of spam detection and to adjust for newer forms of spam that may appear. Additionally, as spam types evolve, the dictionary pair 300 may be updated to include Ngram sizes and character classes that are most effective in detecting the newer forms of spam. As stated above, this may be an automatic adjustment or a manual adjustment set by the user.

Once the spam manager 101 has iterated 504 the subsequences, the spam manager 101 looks up 506 these subsequences or Ngrams in the dictionary pair 300. For the Ngrams that are present in the dictionary pair 300, the spam manager 101 also retrieves 508 the numeric weights associated with each of the Ngrams. If the Ngram is not present in the dictionary pair 300 the spam manager 101 can ignore that Ngram in its calculations for the spam discrimination function. With an adaptive spam manager 101, that Ngram can be added to the dictionary pair 300 if it has determined in the past that the Ngram is commonly found in spam or in non-spam e-mails 104. In this adaptation process, the spam manager 101 could also store the Ngram until the spam discrimination process is finished and the e-mail 104 is determined to be spam or non-spam. At this point, the adaptive spam manager 101 could then catalogue the Ngram according to the results of the discrimination. Alternatively, the adaptive spam manager 101 could keep this Ngram in storage until more information is gathered about that Ngram. The adaptive spam manager 101 could continue to keep track of Ngrams that are not currently in the dictionary pair 300 and record how frequently these uncatalogued Ngrams appear in spam or non-spam e-mails 104. For uncatalogued Ngrams that appear frequently in spam or non-spam, the adaptive spam manager 101 can use the information acquired about the Ngram to calculate a numeric weight and then add the Ngram to the dictionary pair 300.

After looking up 506 the Ngrams in the dictionary and retrieving 508 the associated numeric weights, the spam manager 101 combines 510 the set of retrieved numeric weights using a discrimination function to produce a total spam/non-spam likelihood measure. The discrimination function could exploit any of a variety of discrimination methods including Baynesian networks, neural networks, latent semantic analysis, fuzzy discrimination, genetic algorithms, simple heuristic methods, and the like.

As an example, one methodology could include the use of neural networks, in which the network is trained against both spam and non-spam. The training steps involve analyzing words that occur in samples and their frequency of occurrence. Words that are common to both sample sets are eliminated, and a list of words common to spam and a list of words common to non-spam are left. Using the word list common to spam and the spam sample set, the network is trained to recognize spam. Similarly, using the word list common to non-spam and the non-spam sample set, the network is trained to recognize non-spam. The result is a network which, given a sample, outputs a number that represents the likelihood of the message being spam. The component is configured to consider samples with a value over a given threshold as spam.

After combining 510 the numeric weights, the spam manager 101 produces 512 a spam decision. The spam manager 101 determines whether or not the e-mail 104 is likely to be spam. The spam manager 101 may be configured so that it will recognize a threshold number for the spam discrimination likelihood measure, or some other mechanism for deciding which e-mails 104 fall in the likely-to-be-spam category.

FIG. 6 illustrates an example of a table 600 that could be constructed in the present invention. The table can include an index of characters 604 along the y axis 610 and an index of characters 602 along the x axis 608. The squares 614 of the table include numeric weights 612 measuring the likelihood that the selected character pair (i.e., including a character on the x axis 608 and a character on the y axis 610) will appear together in normal, non-spam, text. Thus, the spam manager 101 might extract bigrams from incoming e-mails 104. The spam manager 101 can then look up the first character of the bigram along the y axis 610 of the table 600. The spam manager 101 can also look up the second character of the bigram along the x axis 608 of table 600. The intersection point or square 612 in the table that contains a numeric weight for the likelihood of the two characters appearing in succession in an e-mail 104 or header is shown in FIG. 6. The spam manager 101 can extrapolate a numeric value from the point of intersection or square 612 of the bigram characters in the table 600. This technique is also discussed later, in relation to trigrams.

In some embodiments, the numeric weight represents the likelihood that the character pair will appear in normal, non-spam or non-randomized text. Thus, a very low numeric weight would imply that the characters do not commonly appear together in normal text (i.e., the letter "z" next to the letter "x" in English text), and so the e-mail 104 may contain a random string of characters or a word that contains disguised features. In other words, the e-mail 104 may be spam. A high numeric weight for a character pair would mean that the e-mail 104 is more likely to contain normal, non-randomized, non-spam text. In other embodiments, the numeric weight represents the likelihood that the character pair will appear in spam e-mail 104 text, or potentially randomized text. Thus, a high numeric weight means that the character pair is likely to be a random pairing found in spam.

The table 600 is useful in identifying randomization and feature disguise techniques employed by spam senders, and the table 600 can be used to turn these techniques into features that assist in spam detection. Spam senders that send bulk e-mail 104 to users often try to conceal the similarity of their e-mails 104 by use of randomization techniques. Spam filtering software and/or hardware can be deployed to analyze message streams to discriminate spam from non-spam messages. These analyses can focus on associating e-mail 104 messages with a similar group of bulk e-mails 104 based on identifiable spam features. The spam filter might recognize that the e-mails 104 are the same or similar, thus making them likely to be a spam bulk e-mailing that the spam filter could prevent from being delivered.

The spam sender can use randomization to disguise the bulk e-mails 104 from the spam filter software/hardware. For example, the spam sender may include a random string of characters in a Subject header field of each e-mail 104 (or anywhere else within an e-mail 104 or a header) in a bulk set of the similar e-mails 104, thus causing traditional spam filters to fail to detect that each of these e-mails 104 in the bulk e-mailing are the same or are similar. The spam filter might allow the bulk e-mails 104 through to the user's e-mail 104 box. Examples of typical spam e-mail headers that use randomization techniques are as follows (with the random character string underlined):

(1) 8 steps to financial freedom hgzuysdovm
(2) Free PORN!!! fhriopqh

Spam senders also use feature disguise techniques to evade detection. As described above, spam filter software/hardware may use filtering techniques that involve recognition of typical identifiable spam features. For example, the terms "FREE" or "PORN" might be words typically found in spam e-mails 104 that spam filters use to identify an e-mail 104 or a bulk e-mailing as spam. Spam senders may try to disguise these words that are highly associated with spam e-mails 104. For example, a spam sender may modify a Subject header field of a spam e-mail 104 to replace the letter "o" in "Porn" with the number zero, so that the string will read "P0rn" instead of "Porn." The reader of the spam e-mail 104 can still read the e-mail 104 subject and determine the content, but the spam filtering software/hardware might not recognize the word and fail to filter out the spam e-mail 104. Examples of typical spam e-mail 104 headers that use feature disguise techniques are as follows (with words using feature disguise techniques underlined):

(1) Obtain Viaqr@ without prescription
(2) No closing cost m0rtgagerefinancing

The fundamental statistical measure of randomness is termed "entropy." Any function or heuristic used to quantify the character-level randomness of words or character sequences is essentially an entropy-based metric, whether or not it conforms exactly to the statistical definition of entropy. Significant positive correlation of a randomness metric with the classical definition of entropy is what distinguishes an entropy-based metric from other metrics that might be employed in spam feature identification. The entropy of X or H(X), is a statistical measure that quantifies the degree of randomness or uncertainty of the discrete random variable X (where X takes on values $x_1, x_2, \ldots, x_n$ with probabilities $P(x_1), P(x_2), \ldots, P(x_n)$). Entropy is normally measured in bits and is usually defined as:

$$H(X) = -P(x)\sum_{x \in X} P(x)\log_2 P(x)$$

For example, a random variable X={$x_1, x_2$} with $P(x_1)=\frac{1}{2}$ and $P(x_2)=\frac{1}{2}$ has an H(X)=1 bit. Thus, it requires one bit to reveal the outcome of a random draw from X. Since both outcomes in this example are equally likely, the uncertainty is maximized (similar to flipping a fair coin). Another random variable X={$x_1, x_2$} with $P(x_1)=\frac{3}{4}$ and $P(x_2)=\frac{1}{4}$ has an H(X') =~0.81s bits. The outcome is less uncertain, and one could guess $x_1$ as the outcome and be correct in the majority of the cases (similar to tossing an unfair coin).

Similarly, the spelling of words in a given language is not purely random, but is somewhat similar to tossing an unfair coin or rolling weighted dice. For example, in English, if the first character of a word is "q," it is highly likely to be followed by a "u," and highly unlikely to be followed by a "z." Thus, the table 600 can be used to determine the likelihood that a given bigram will exist in spam or non-spam text. If the character pair is not likely to be found in normal text, it may be part of a random string of characters added to a spam e-mail 104 header, for example. If numerous unlikely character pairs (i.e., a "q" next to a "z" next to a "w" in a random string or a "p" next to a "0" next to an "r" for "P0rn") are found in an e-mail 104 header, then the header may contain randomization or feature disguise techniques. The numeric weights of the bigrams can be combined to produce an overall value representing the likelihood that an e-mail 104 is spam or non-spam. These methods are discussed in more detail below.

The discussion regarding table 600 above has focused on the use of bigrams, where the table 600 includes a string of single characters along the x axis 608 and also along the y axis 610. However, in other embodiments, longer character subsequences can be used to construct table 600, such as trigrams, tetragrams, pentagrams, etc., to provide additional accuracy. Tables of longer Ngrams can be constructed in a number of manners. For example, the table for trigrams could be represented as either a three-dimensional table or as a two-dimensional table with two character pairs along one axis and a string of single characters along another axis. The associated numeric weight could show the likelihood of the character pair appearing in order in normal text followed successively by the single character.

Alternatively, unigrams could be employed, where only single character probabilities are used, although this method would provide less accuracy than the use of bigrams or Ngrams with a higher N value. Unigram tables could include a column of characters and associated numerical weight values, although typically unigrams are of negligible discrimination value.

As another example, the spam manager 101 could construct one table that includes some single characters along each axis for bigram analysis and some double characters along each axis for trigram or tetragram analysis. The spam manager 101 could alternatively construct a number of separate tables, one for bigram analysis, one for trigram analysis, and so forth. The spam manager 101 could use any one or more of these tables at a time for e-mail 104 analysis. Construction of the table is discussed in more detail below.

FIG. 7 is a flowchart illustrating a method of constructing a collection of spam-distinguishing features, such as a table 600, according to some embodiments of the present invention. In some embodiments, the table 600 is constructed as a part of the construction process for the spam manager 101. Thus, the table 600 is constructed in advance, as part of the spam manager 101 creation process, in these embodiments. In other embodiments, a modified or adaptive form of the spam manager 101 can construct the table 600 as part of the spam manager 101 adaptation process. In this adaptation process, the spam manager 101 can continue to develop the table 600 while the spam manager 101 is detecting spam. Such an adaptive spam manager 101 might only modify certain parts of the dictionary pair 300 (i.e., might modify the weights included in the table 600). However, such an adaptive spam manager 101 could also be configured to fully construct the table 600. The embodiments in which the spam manager 101 constructs the table 600 are discussed below regarding FIG. 7. However, each of the steps illustrated in FIG. 7 could be performed in advance, during the development of the spam manager 101, rather than being performed by the spam manager 101, itself.

The spam manager 101 creation or adaptation process can first construct 702 the table 600 framework and then add 704 characters or character sets to the axes 608, 610 of the table. If the table 600 will be used for analysis of bigrams in incoming e-mails 104, the spam manager 101 can just add single characters along the x axis 608 and y axis 610 of the table without any further analysis. It is possible to add alphabetic characters, numerical characters, punctuation marks, symbols, etc. or any combination of any of these along the axes 608, 610. If the table 600 will be used for analysis of unigrams in incoming e-mails 104, it is possible to construct a table framework for only one set of characters along one axis. Similarly, if Ngrams longer than unigrams or bigrams are used, the table 600 can include some character pairs along one or both axes 608, 610. In other embodiments, the invention can be implemented in a table with more than two axes, or the invention can be implemented in other types of data structures which would be recognized by one of skill in the relevant art based on the disclosure herein.

Table 600 can alternatively be constructed in a manner similar to the construction of dictionary pair 300, where representative e-mails 104 are first analyzed before construction of the framework. In this manner, the spam manager 101 creation or adaptation process can first analyze sample e-mails 104 to choose 703 what size Ngrams should be used to effectively identify randomization and feature disguise, and thus allow detection of spam. The spam manager 101 creation or adaptation process can also optionally choose 703 character classes among the representative spam and non-spam e-mail 104 content or header fields. Character classes can be chosen 703 to maximize effectiveness in distinguishing between spam and non-spam. Additionally, if a table 600 with larger Ngrams (e.g., trigrams, tetragrams, pentagrams, etc.) is being assembled, some sample e-mail 104 analysis may be preferable. Rather than including all possible letter combinations together in a very large table, it may be better to first do some analysis to determine which of all of the possible letter combinations are most useful in detecting spam. The table can be limited to include only these combinations. Such smaller tables may use any of the well-known representation techniques discussed later. In addition, as spam senders' evasion techniques evolve and as spam senders adjust to the technology described herein, it may be necessary to adjust Ngram sizes for greater accuracy.

The spam manager 101 creation or adaptation process then computes 706 the numeric weights of the character pairs or sets. As stated above, the numeric weights represent the likelihood of the characters appearing (or not appearing) together successively in normal text. The weights may vary dependent upon language. The character pair likelihoods may be the actual probabilities, the logs of the probabilities, the integer product of the probabilities (or logs of the probabilities) multiplied by a constant, etc. In any case, the numeric weights should be directly correlated with the actual probabilities. These weights can be determined by analyzing the appearance of these letters in typical text. These weights could also be determined by examining a sample set of e-mails 104, as described above, since normal e-mail 104 text may vary somewhat from normal text included in letters or other forms of text. Sample e-mails 104 could also be used to compute 706 the likelihood of character pairs or sets appearing in spam e-mail 104 text. This could be done alternatively or as a complement to the table showing the likelihood of characters appearing in normal text.

Table 600 could also be an alternative to the dictionary pair 300. A table 600 pair could be constructed in which one table includes numeric weights representing the likelihood of an Ngram to appear in spam e-mails 104, and the other table includes numeric weights representing the likelihood of an Ngram to appear in non-spam. These tables could be constructed in a manner similar to dictionary pair 300.

Finally, the spam manager 101 creation or adaptation process then fills in 708 the numeric weights in the appropriate locations of the table 600 to complete its construction. This method may alternatively be implemented in either software or hardware form. In software, the Ngram table could be stored in an associative data structure, such as a hash table, a binary search tree, a red/black tree, and other similar structures. In hardware, the Ngram dictionaries could be stored in CAM. The method can also be implemented in firmware, or any combination of software, hardware, or firmware.

Referring again to FIG. 5, there is shown a flowchart illustrating a method of distinguishing between spam and non-spam e-mails 104. This method can be applied using a collection of spam-distinguishing features that is either a dictionary pair 300, as described previously, or a table 600. The spam manager 101 extracts 502 a sequence of characters from an incoming e-mail 104. The spam manager 101 then iterates 504 subsequences within the sequence. The spam manager 101 iterates subsequences by extracting Ngrams from the sequence. As discussed previously, the size of the Ngrams and character classes can be selected to afford increased effectiveness in spam discrimination. In some embodiments, the spam manager 101 is adaptive, and continues to develop the table during detection of spam. This adaptation process was discussed above regarding the construction of a dictionary pair 300.

Once the spam manager 101 has iterated 504 the subsequences, the spam manager 101 looks up 506 these subsequences or Ngrams in the table and retrieves 508 the numeric weights associated with each of the Ngrams. The spam manager 101 then combines 510 each of the retrieved numeric weights for the pairs/sets of characters into an entropy-based metric for the whole character sequence extracted from the e-mail 104. Thus, an overall metric for the character sequence or the character sequence randomness is determined by combining 510 the numeric weights of each Ngram using either simple addition, multiplication, or some correlated value, such as a mean (arithmetic, geometric, harmonic, etc.).

For example, in the sequence "foobar," the successive character pairs or bigrams are "fo," "oo," "ob," "ba," and "ar." Their respective likelihoods may be computationally combined, typically by addition or multiplication, to obtain the entropy-based metric that quantifies the randomness of the given character sequence. Then the entropy-based metric value may be used directly by spam discrimination logic, or a threshold test may be applied to produce a binary decision as to whether the character sequence is or is not a randomizer or a disguised feature. Below is an example list (obtained from The Simplified Spelling Society, www.simplifiedspelling.org) of increasingly likely (decreasing entropy) character sequences as examples of how an entropy-based metric can distinguish relative degrees of character sequence randomness and do so effectively across different natural languages.

(a)   ZEWRTZYNDADXESYJRQY-WGECIJJ-CBVKR-BOPQZB-YMBUABWLBTQCNIK (b)   AI-NGAE-ITF-NNR-ASAEV-OIE-BAINTHA-HYR-OO-POER-SETRYGAIE (c)   URTESHETHING-AD-E-AT-FOULE-ITHALIORT-W-ACT-C-STE-MINTSA (d)   IANKS-CAN-OU-ANG-RLER-THATTED-OF-TO-S-H-OR-OF-TO-HAVEME (e)   JOU-MOUETAS-DE-MONNERNAISSAINS-BEME-US-VREH-PRE-TU-DE (f)   BET-F-REINER-SOMMEIT-SINACH-OSST-BETT-O-ER-ZUM-WIE-BEST (g)   RAMA-DE-LLA-EL-GUIA-IMO-SUS-CONDIAS-S-U-E-UNCONDADADO

In the above list of random character sequences having different entropy-based metric values, example (a) shows a maximum entropy character sequence, where each character is equally likely. Example (b) shows a character sequence exhibiting English language unigram probabilities or single character relative frequencies based on natural English text. Example (b) demonstrates less entropy than example (a). Example (c) shows a character sequence exhibiting English language bigram probabilities or character pair relative frequencies based on natural English text. Example (c) demonstrates less entropy than example (b). Example (d) shows a character sequence exhibiting English language trigram probabilities or character triplet relative frequencies based on natural English text. Example (d) demonstrates less entropy than example (c). Example (e) shows a character sequence exhibiting French language trigram probabilities or character triplet relative frequencies based on natural French text. Example (f) shows a character sequence exhibiting German language trigram probabilities and Example (g) shows a character sequence exhibiting Spanish language trigram probabilities. As can be seen in examples (d) through (g), the trigrams are more recognizable as typical word components than the bigrams or unigrams. It is even possible to distinguish between the different natural languages by just looking at these character combinations.

After combining 510 the numeric weights, the spam manager 101 produces 512 a spam decision. The spam manager 101 determines whether or not the e-mail 104 is likely to be found in normal text or instead is likely to contain randomization typically found in spam. The spam manager 101 may be configured so that it will recognize a threshold number for spam determination.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for detecting spam by extracting generalized Ngrams from a section of an e-mail, the method comprising the steps of:
   a spam manager extracting a sequence of characters from a section of an e-mail;
   the spam manager iterating subsequences within the sequence;
   the spam manager comparing the subsequences to collections of spam-distinguishing subsequences to identify spam e-mail messages, the collections comprising a spam dictionary of Ngrams that are commonly found in spam e-mail and a non-spam dictionary of Ngrams that are commonly found in non-spam e-mail, each Ngram in each dictionary having a weight value associated with it, the weight value in the spam dictionary representing the relative occurrence frequency of the Ngram in spam e-mail and the weight value in the non-spam dictionary representing the relative occurrence frequency of the Ngram in non-spam e-mail, wherein the comparing step comprises:
      the spam manager searching one or more of the dictionaries for Ngrams matching the subsequences;
      the spam manager retrieving the weight value for matching Ngrams that are found; and
      the spam manager combining the retrieved weight values using a discrimination function to measure the likelihood that an e-mail is spam; and
   the spam manager producing a spam detection decision, based on the comparison, regarding whether or not the e-mail is likely to be a spam e-mail message.

2. The method of claim 1 wherein the step of the spam manager iterating subsequences within the sequence further comprises the spam manager selecting successive Ngrams from a section of an e-mail, wherein Ngrams are subsequences that are N characters in length.

3. The method of claim 1 wherein the step of the spam manager iterating subsequences within the sequence further comprises the spam manager selecting subsequences that are N characters in length, wherein the characters are treated as a single class for selection.

4. The method of claim 1 wherein the step of the spam manager iterating subsequences within the sequence further comprises the spam manager selecting subsequences that are N characters in length, wherein the characters are subdivided into separate character classes.

5. The method of claim 4 wherein the separate character classes comprise classes from a group of classes consisting of alphabetic, numeric, punctuation, and white space.

6. The method of claim 1 further comprising constructing the spam dictionary comprising Ngrams that are commonly found in spam e-mail by measuring the relative occurrence frequencies of the Ngrams over sample sets of e-mails.

7. The method of claim 1 further comprising constructing the non-spam dictionary comprising Ngrams that are commonly found in non-spam e-mail by measuring the relative occurrence frequencies of the Ngrams over sample sets of e-mails.

8. The method of claim 1 wherein the spam and non-spam dictionaries comprise a single dictionary comprising positive and negative weight values, and wherein the positive weight values indicate that the Ngram is commonly found in non-spam email and the negative weight values indicate that the Ngram is commonly found in spam email.

9. The method of claim 1 further comprising recognizing a threshold number for the discrimination function over which the e-mail is likely to be a spam e-mail.

10. The method of claim 1 wherein the step of the spam manager comparing subsequences to collections of spam-distinguishing subsequences further comprises the spam manager constructing a table of the likelihood of pairs of characters to appear in an e-mail message.

11. The method of claim 1 wherein the step of the spam manager comparing subsequences to collections of spam-distinguishing subsequences further comprises the spam manager comparing a sequence of at least one character selected from an e-mail to a table showing the probability value that the at least one character will appear in normal text.

12. The method of claim 1 wherein the step of the spam manager comparing subsequences to collections of spam-distinguishing subsequences further comprises the spam manager comparing a subsequence of characters selected from an e-mail to a table of two-character combinations.

13. The method of claim 12 wherein each two-character sequence in the table is associated with a weight value, each weight value representing the probability that the subsequence of characters will appear together in non-random text.

14. The method of claim 13 further comprising the steps of:
   the spam manager using the table to determine the weight value of the subsequence; and
   the spam manager computationally combining the weight values of subsequences in an e-mail to determine if the e-mail is spam.

15. The method of claim 1, wherein the section of an e-mail comprises an e-mail section from a group of sections consisting of: a subject header field, a to header field, a from header field, and an e-mail body.

16. The method of claim 1, further comprising determining a size N for the Ngrams based at least in part on a language of the email.

17. The method of claim 1, further comprising determining a size N for the Ngrams based at least in part on statistical metrics that quantify the discriminatory value of particular Ngrams.

18. A system for detecting spam by extracting generalized Ngrams from a section of an e-mail, the system comprising a computer the computer comprising:
- a computer readable medium storing executable software portions comprising:
    - a software portion configured to extract a sequence of characters from a section of an e-mail;
    - a software portion configured to iterate subsequences within the sequence; and
    - a software portion configured to compare subsequences to collections of spam-distinguishing subsequences to identify spam e-mail messages, the collections comprising a spam dictionary of Ngrams that are commonly found in spam e-mail and a non-spam dictionary of Ngrams that are commonly found in non-spam e-mail, each Ngram in each dictionary having a weight value associated with it, the weight value in the spam dictionary representing the relative occurrence frequency of the Ngram in spam e-mail and the weight value in the non-spam dictionary representing the relative occurrence frequency of the Ngram in non-spam e-mail, wherein the software portion configured for the comparison comprises:
        - a software portion for searching one or more of the dictionaries for Ngrams matching the subsequences;
        - a software portion for retrieving the weight value for matching Ngrams that are found; and
        - a software portion for combining the retrieved weight values using a discrimination function to measure the likelihood that an e-mail is spam; and
    - a software portion for producing a spam detection decision, based on the comparison, regarding whether or not the e-mail is likely to be a spam e-mail message; and
- a processor configured to execute the software portions stored by the computer readable medium.

19. The system of claim 18 wherein the software portion configured to iterate subsequences within the sequence comprises a software portion that is configured to select successive Ngrams from a section of an e-mail, wherein Ngrams are subsequences that are N characters in length.

20. The system of claim 18 wherein the spam and non-spam dictionaries comprise a single dictionary comprising positive and negative weight values, the positive weight values indicating that the Ngram is commonly found in non-spam email and the negative weight values indicating that the Ngram is commonly found in spam email.

21. The system of claim 18 wherein the software portion configured to compare subsequences to collections of spam-distinguishing subsequences further comprises a software portion configured to compare a subsequence selected from a section of an e-mail to a table of sets of characters, wherein character sets are associated with weight values that represent the likelihood that characters will appear together in a non-spam e-mail.

22. The system of claim 21, the computer readable medium further comprising:
- a software portion configured to use the table to determine the weight value of the character sets selected from the e-mail; and
- a software portion configured to computationally combine the weight values of the character sets in the e-mail to determine if the e-mail is spam.

23. A computer readable medium storing a computer program product for detecting spam by extracting generalized Ngrams from a section of an e-mail, the computer program product comprising:
- program code for extracting a sequence of characters from a section of an e-mail;
- program code for iterating subsequences within the sequence; and
- program code for comparing the subsequences to collections of spam-distinguishing subsequences to identify spam e-mail messages, the collections comprising a spam dictionary of Ngrams that are commonly found in spam e-mail and a non-spam dictionary of Ngrams that are commonly found in non-spam e-mail, each Ngram in each dictionary having a weight value associated with it, the weight value in the spam dictionary representing the relative occurrence frequency of the Ngram in spam e-mail and the weight value in the non-spam dictionary representing the relative occurrence frequency of the Ngram in non-spam e-mail, wherein the program code for comparing comprises:
    - program code for searching one or more of the dictionaries for Ngrams matching the subsequences;
    - program code for retrieving the weight value for matching Ngrams that are found; and
    - program code for combining the retrieved weight values using a discrimination function to measure the likelihood that an e-mail is spam; and
- program code for producing a spam detection decision, based on the comparison, regarding whether or not the e-mail is likely to be a spam e-mail message.

24. The computer program product of claim 23 wherein the program code for iterating subsequences within the sequence comprises program code for selecting successive Ngrams from a section of an e-mail, wherein Ngrams are subsequences that are N characters in length.

25. The computer program product of claim 23 wherein the program code for iterating subsequences within the sequence comprises program code configured to select subsequences that are N characters in length, wherein the characters are divided into one or more classes of characters.

26. The computer program product of claim 23, wherein the spam and non-spam dictionaries comprise a single dictionary comprising positive and negative weight values, the positive weight values indicating that the Ngram is commonly found in non-spam email and the negative weight values indicating that the Ngram is commonly found in spam email.

27. The computer program product of claim 23 further comprising recognizing a threshold number for the discrimination function over which the e-mail is likely to be a spam e-mail.

28. The computer program product of claim 23 wherein the program code for comparing subsequences to collections of spam-distinguishing subsequences comprises program code for comparing character subsequences selected from an e-mail to a table of character subsequence combinations.

29. The computer program product of claim 28 wherein character sequence combinations in the table are associated with weight values that represent the probability that characters will appear together in a non-spam e-mail.

30. The computer program product of claim 29 further comprising:

program code for using the table to determine the weight values of the character subsequences selected from an e-mail; and program code for computationally combining the weight values of the character subsequences to calculate the level of randomness of the sequence of characters extracted from a section of an e-mail.

31. The computer program product of claim 23, wherein the section of an e-mail comprises an e-mail section from a group of sections consisting of: a subject header field, a to header field, a from header field, and an e-mail body.

* * * * *